United States Patent
Shahid et al.

(10) Patent No.: US 12,543,105 B2
(45) Date of Patent: Feb. 3, 2026

(54) RADIO ACCESS TECHNOLOGY PRIORITIZATION

(71) Applicant: T-Mobile USA, Inc., Bellevue, WA (US)

(72) Inventors: Wafik Abdel Shahid, Bellevue, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/516,824

(22) Filed: Nov. 21, 2023

(65) Prior Publication Data

US 2024/0089845 A1    Mar. 14, 2024

Related U.S. Application Data

(62) Division of application No. 17/307,949, filed on May 4, 2021, now Pat. No. 11,844,013.

(51) Int. Cl.
*H04W 16/14*     (2009.01)
*H04W 24/10*     (2009.01)
*H04W 48/16*     (2009.01)
*H04W 48/18*     (2009.01)

(52) U.S. Cl.
CPC .......... *H04W 48/16* (2013.01); *H04W 16/14* (2013.01); *H04W 24/10* (2013.01); *H04W 48/18* (2013.01)

(58) Field of Classification Search
CPC ..... H04W 48/18; H04W 24/10; H04W 16/14; H04W 48/16
See application file for complete search history.

(56) References Cited

U.S. PATENT DOCUMENTS

| | | | |
|---|---|---|---|
| 9,026,112 B2 | 5/2015 | Klingenbrunn et al. | |
| 9,706,485 B2 | 7/2017 | Namboodiri et al. | |
| 11,297,553 B1* | 4/2022 | Marupaduga | H04W 36/34 |
| 2004/0266435 A1 | 12/2004 | De Jong et al. | |
| 2008/0176565 A1 | 7/2008 | Eerolainen et al. | |
| 2011/0319085 A1 | 12/2011 | Ishii et al. | |
| 2012/0106370 A1 | 5/2012 | Radulescu et al. | |
| 2012/0302241 A1 | 11/2012 | Klingenbrunn et al. | |
| 2015/0296520 A1 | 10/2015 | Batchu et al. | |

(Continued)

FOREIGN PATENT DOCUMENTS

| | | |
|---|---|---|
| EP | 2127471 A1 | 12/2009 |
| EP | 2244505 A1 | 10/2010 |

(Continued)

*Primary Examiner* — Dai Phuong
(74) *Attorney, Agent, or Firm* — Perkins Coie LLP

(57) ABSTRACT

A mobile device determines the radio access technology (RAT) to use to connect to a wireless network at a geographic location based on determining the highest priority RAT that the mobile device is compatible with in the geographic location. The highest priority RAT in the geographic location is, for example, the RAT with the largest aggregate bandwidth or the RAT with the best user quality of experience in the geographic location. The mobile device can determine the highest priority RAT based on band and bandwidth information at the geographic location or the wireless network can determine the highest priority RAT based on band and bandwidth or measurement reports received from mobile devices in the geographic location.

19 Claims, 4 Drawing Sheets

(56) References Cited

U.S. PATENT DOCUMENTS

| | | | |
|---|---|---|---|
| 2016/0157161 A1 | 6/2016 | Miao et al. | |
| 2017/0094591 A1 | 3/2017 | Namboodiri et al. | |
| 2019/0013881 A1* | 1/2019 | Olesen | H04B 7/0413 |
| 2019/0069328 A1 | 2/2019 | Sharma | |
| 2019/0075504 A1* | 3/2019 | Santhanam | H04W 36/322 |
| 2019/0191342 A1* | 6/2019 | Mandavilli | H04W 36/08 |
| 2019/0205319 A1 | 7/2019 | Yerrabommanahalli et al. | |
| 2019/0253944 A1* | 8/2019 | Kim | H04W 36/0072 |
| 2020/0053642 A1 | 2/2020 | Huang-Fu et al. | |
| 2020/0275259 A1 | 8/2020 | Zhu et al. | |
| 2021/0084576 A1* | 3/2021 | Zhu | H04W 48/16 |
| 2022/0109496 A1* | 4/2022 | Shrestha | H04B 7/18519 |
| 2022/0182943 A1* | 6/2022 | Maleki | H04W 52/0216 |
| 2022/0338018 A1 | 10/2022 | Shen et al. | |
| 2022/0377829 A1* | 11/2022 | Kim | H04W 76/27 |
| 2023/0066322 A1* | 3/2023 | Wang | H04W 48/20 |

FOREIGN PATENT DOCUMENTS

| | | |
|---|---|---|
| EP | 2837234 A2 | 2/2015 |
| EP | 3360375 A1 | 8/2018 |
| KR | 101155553 B1 | 6/2012 |
| KR | 20150113018 A | 10/2015 |
| KR | 101728453 B1 | 4/2017 |
| KR | 20180063213 A | 6/2018 |
| WO | 2015156948 A1 | 10/2015 |
| WO | 2017058571 A1 | 4/2017 |

\* cited by examiner

RADIO ACCESS TECHNOLOGY PRIORITIZATION

CROSS-REFERENCE TO RELATED APPLICATIONS

This application is a division of U.S. patent application Ser. No. 17/307,949, filed on May 4, 2021, entitled RADIO ACCESS TECHNOLOGY PRIORITIZATION, which is hereby incorporated by reference in its entirety.

BACKGROUND

A Radio Access Technology or (RAT) is the underlying physical connection method for a radio based communication network. Many modern mobile phones support several RATs in one device such as Bluetooth, Wi-Fi, GSM, UMTS/WCDMA, CDMA (e.g., CDMA2000), LTE, 5G NR (e.g., non-standalone (NSA) NR and Standalone (SA) NR), etc. A mobile terminal, while connected using a RAT, performs neighbor cell measurements and sends measurement reports to the network. Based on these measurement reports provided by the mobile terminal, the network can initiate handover from one RAT to another, e.g. from LTE to NR or vice versa.

BRIEF DESCRIPTION OF THE DRAWINGS

Detailed descriptions of implementations of the present invention will be described and explained using the accompanying drawings.

Figure 1:
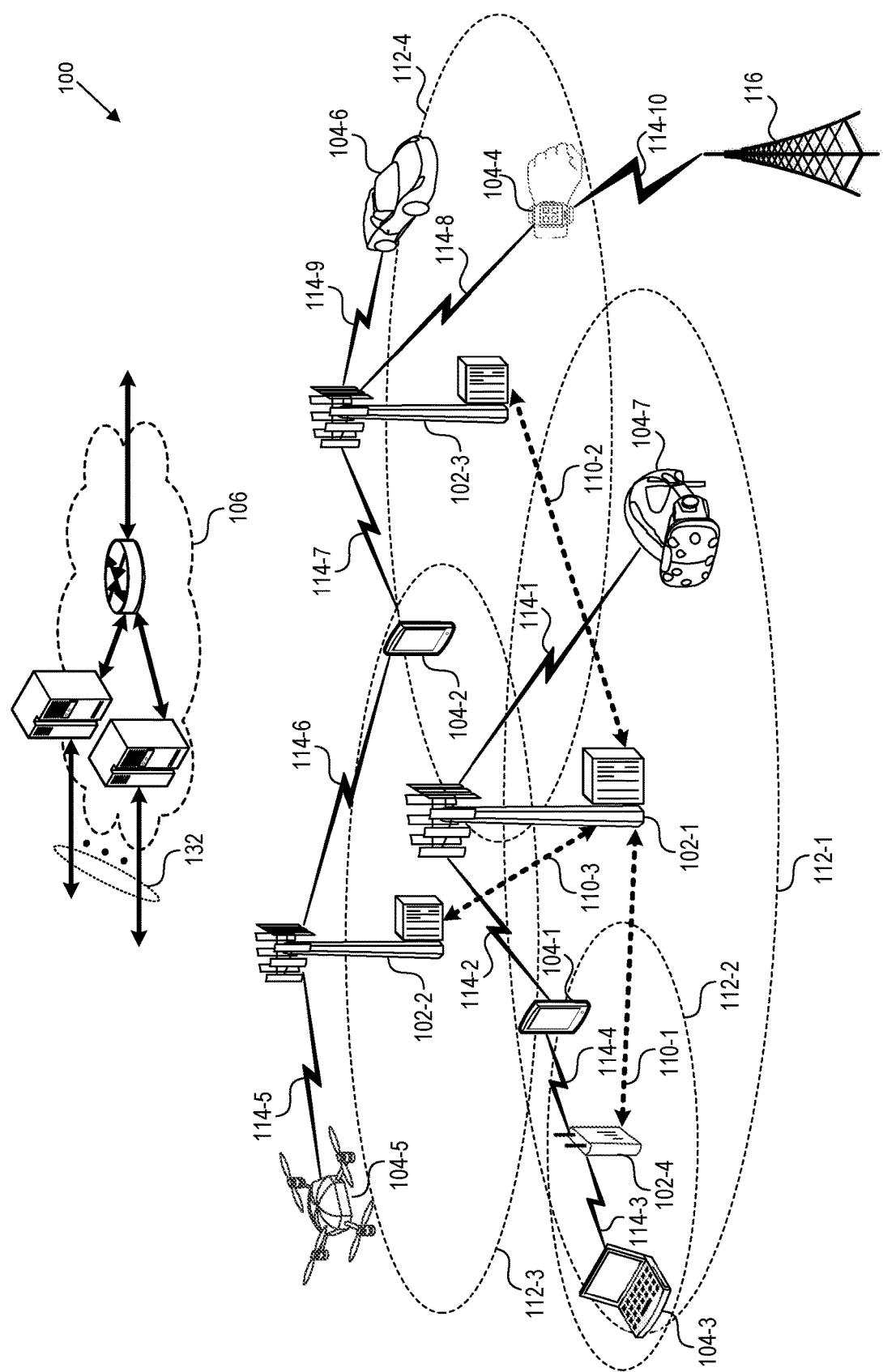
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In one aspect of the technology described in detail below, a mobile device (e.g., a user equipment (UE)) determines a first radio access technology (RAT) priority order at a first geographic location of the cellular telecommunications network and determines if the UE is connected to the cellular network using a first RAT in the first RAT priority order. The first RAT is the highest priority RAT in the first RAT priority order that the UE is compatible with. If the UE determines that it is not connected to the cellular network using the first RAT (or if it not connected to the cellular network at all), the UE connects to the cellular network using the first RAT.

In another aspect, the UE determines a first RAT at a first geographic location of a wireless network, where the first RAT is the highest priority RAT in the first geographic location that the UE is compatible with. The highest priority RAT is the RAT in the geographic location with, e.g., a largest aggregate bandwidth or the best user quality of experience in the geographic location.

In another aspect, a network node of a communication network receives measurement reports from mobile devices. The measurement reports include one or more measurements on one or more RATs, and location information corresponding to the one or more measurements. The network node determines a RAT priority order (or a highest priority RAT for a mobile device) based, at least in part, on the measurement reports. The network node transmits the RAT priority order or the highest priority RAT information to the mobile devices, where the transmitted RAT priority order or the highest priority RAT is based on the mobile devices' geographic locations.

5G New Radio (NR) devices support different modes including, for example, LTE only, non-standalone (NSA) NR, and standalone (SA) NR. Additionally, different NR devices support different bandwidths and bands in both NSA and SA modes. The default RAT/mode selected by the NR device (e.g., the latest 3GPP Release RAT/mode) might not always provide the best experience for the end user in a particular geographic location. For example, a new NR device might default to using an NR SA RAT in a geographic location served by NR band n71 (600 MHz). However, the NR device might also be capable of operating using an LTE RAT at LTE band B71 (also 600 MHz). If the operator has allocated a higher bandwidth for LTE B71 than they have allocated to NR n71, the NR device might not offer as good of a user experience when connected using an NR SA RAT (the default) as it would if it were connected using an LTE RAT or if using NSA mode (e.g., EUTRA-NR dual connectivity (EN-DC)). For example, the mobile device user might experience faster speeds or lower network latencies in NSA than in SA because NSA can aggregate throughput of LTE and NR.

The disclosed technology ensures that the mobile device is able to prioritize the RATs available in different geographic locations based on the device's capability and the network RAT/band and bandwidth supported in the geographic locations so that the device is always connected to the RAT/band/mode that provides the best quality of experience instead of always connecting to or attempting to connect to the default RAT (e.g., latest release RAT) first. Some measures of quality of service or quality of experience that could be used in selecting RATs include latency or delay, aggregate bandwidth or throughput, error rate, required/requested service, etc.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over an LTE/LTE-A communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Computer System

Figure 2:
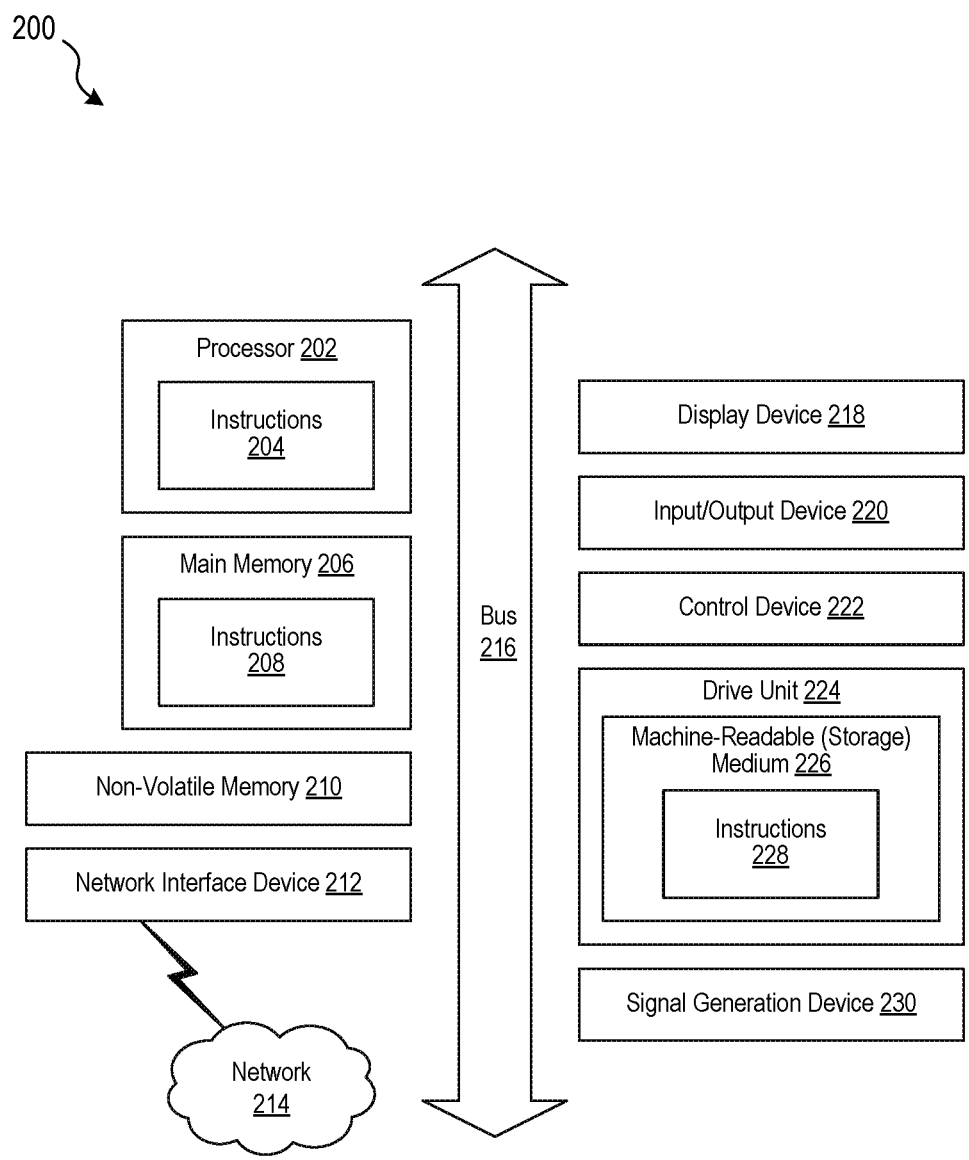
FIG. 2 is a block diagram that illustrates an example of a computer system in which at least some operations described herein can be implemented.

FIG. 2 is a block diagram that illustrates an example of a computer system 200 in which at least some operations described herein can be implemented. As shown, the computer system 200 can include: one or more processors 202, main memory 206, non-volatile memory 210, a network interface device 212, video display device 218, an input/output device 220, a control device 222 (e.g., keyboard and pointing device), a drive unit 224 that includes a storage medium 226, and a signal generation device 230 that are communicatively connected to a bus 216. The bus 216 represents one or more physical buses and/or point-to-point connections that are connected by appropriate bridges, adapters, or controllers. Various common components (e.g., cache memory) are omitted from FIG. 2 for brevity. Instead, the computer system 200 is intended to illustrate a hardware device on which components illustrated or described relative to the examples of the figures and any other components described in this specification can be implemented.

The computer system 200 can take any suitable physical form. For example, the computing system 200 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 200. In some implementation, the computer system 200 can be an embedded computer system, a system-on-chip (SOC), a single-board computer system (SBC) or a distributed system such as a mesh of computer systems or include one or more cloud components in one or more networks. Where appropriate, one or more computer systems 200 can perform operations in real-time, near real-time, or in batch mode.

The network interface device 212 enables the computing system 200 to mediate data in a network 214 with an entity that is external to the computing system 200 through any communication protocol supported by the computing system 200 and the external entity. Examples of the network interface device 212 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 206, non-volatile memory 210, machine-readable medium 226) can be local, remote, or distributed. Although shown as a single medium, the machine-readable medium 226 can include multiple media (e.g., a centralized/distributed database and/or associated caches and servers) that store one or more sets of instructions 228. The machine-readable (storage) medium 226 can include any medium that can store, encoding, or carrying a set of instructions for execution by the computing system 200. The machine-readable medium 226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 204, 208, 228) set at various times in various memory and storage devices in computing device(s). When read and executed by the processor 202, the instruction(s) cause the computing system 200 to perform operations to execute elements involving the various aspects of the disclosure.

Geo-Based RAT Prioritization

Figure 3:
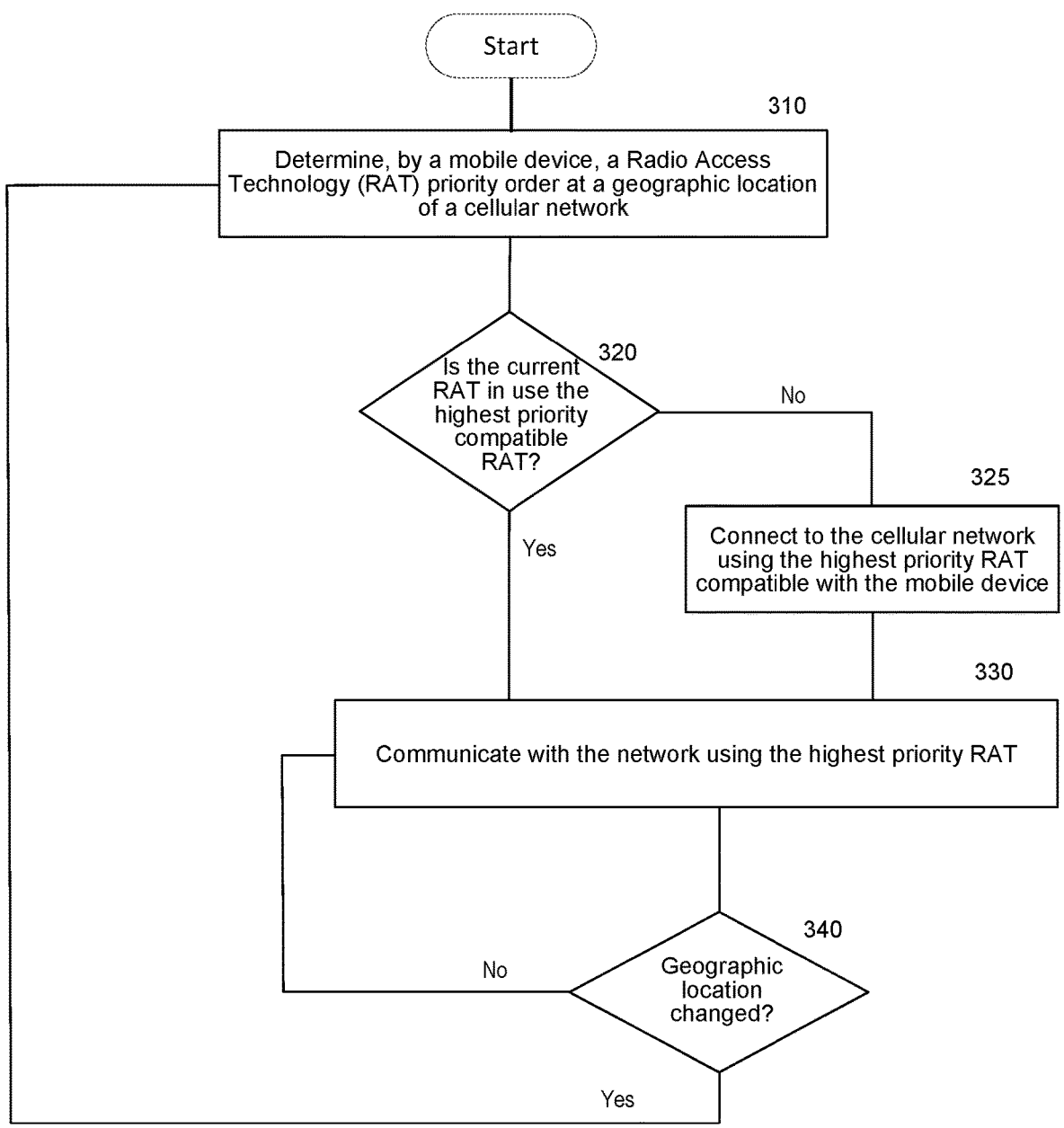
FIG. 3 is a flowchart that illustrates a mobile device operation based on a RAT priority.

FIG. 3 is a flowchart 300 that illustrates a mobile device's (e.g., a user-equipment (UE)) operation based on a RAT priority. At 310 the mobile device determines a RAT priority order at a geographic location of a mobile communication network (e.g., a cellular network). In some implementations, determining the RAT priority order at the geographic location comprises determining a number of frequency bands available to one or more RATs at the geographic location, determining a bandwidth for each one of the number of frequency bands, and ranking the one or more RATs based the number of frequency bands and the bandwidth. The ranking of the one or more RATs can be based on, for example, the different 5G modes supported in the geographic location (e.g., non-standalone (NSA) or standalone (SA) 5G NR modes). A first RAT would be ranked higher in the priority order than a second RAT if, for example, the first RAT has more bands available in the geographic location, if the first RAT has bands with more bandwidth in the geographic location, of if the aggregate bandwidth (considering the total bandwidth available in all the bands) is larger for the first RAT than the second RAT (and if the mobile device is capable or operating on the bands/bandwidth available in the geographic location).

In some implementations, the mobile device includes an onboard lookup table (e.g., contained in main memory 206, non-volatile memory 210, or machine-readable storage medium 226 in FIG. 2) containing the operators' and/or roaming partners' bands, RATS, bandwidth per band, and 5G modes supported in a given geographic location (e.g., corresponding to different GPS or GNSS coordinates). In these implementations, determining the RAT priority order at 310 comprises querying the onboard lookup table or memory for a RAT priority order based on a GPS/GNSS coordinate of the mobile device. In other implementations, this information is contained in the network (e.g., network 214 in FIG. 2) and is accessed by the mobile device (e.g., using network interface device 212) after the mobile device connects to the network using the mobile device's default RAT.

The RAT priority order determined at 310 can change when the network capability at the geographic location changes, e.g., the operator allocates more bands or more bandwidth for a particular RAT at the geographic location (or device capability unlocked or device reconfigured to support more bands/bandwidth/NR modes). For example, if a geographic location served by NR band n71 and LTE band B71 previously had a larger bandwidth allocated to B71, the highest priority RAT in the RAT priority order determined at 310 would have been LTE (or NSA NR). However, if the operator subsequently reconfigures the 600 MHz band at the geographic location to allocate a larger bandwidth to n71, the highest priority RAT in the RAT priority order determined at 310 for the geographic location would now be SA NR. But, if the mobile device does not support SA NR, the highest priority compatible RAT would be LTE (or, e.g., UMTS/WCDMA if this RAT provides a larger aggregate bandwidth or user quality of experience in the specific geographic location than LTE would). The disclosed technology therefore ensures that the mobile device is able to dynamically prioritize the RATs available in different geographic locations based on the device's capability and the network RAT/band and bandwidth supported in the geographic locations so that the device is always connected to the RAT/band/mode that provides the best quality of experience.

In some implementations, determining the RAT priority order at the geographic location in 310 comprises receiving the RAT priority order from the cellular network through a radio resource control (RRC) or other higher layer configuration message; through an Open Mobile Alliance Device Management (OMA-DM) short message system (SMS) or Wireless Application Protocol (WAP) push configuration message; through a Transmission Control Protocol (TCP) message, etc. The mobile device can fetch a different configuration (e.g., request configuration corresponding to the operator's PLMN list or PLMNs that the user device is planning to roam into) and this configuration can be used to identify the geolocation and determine the highest priority RAT in the geolocation.

At 320, the mobile device determines if it is connected the cellular network using the highest priority RAT that the mobile device is compatible with for the geographic location (e.g., on cell reselection during roaming or handover). For initial cell selection, the mobile device determines that it is not connected to any RAT and can therefore connect to the network using the highest priority compatible RAT for the geographic location. That is, upon entering a cell during cell search and acquisition, the UE can decide on the RAT priority in the given geographic location using its onboard GPS/GNSS system. The RAT priority and/or the band priority in the given geographic area provides the best RAT to use to access the network.

In some implementations, the best RAT provides the best or largest aggregate bandwidth for the user at the geographic location based on the mobile device's capability. For example, the largest aggregate bandwidth available to the mobile device can be based on a device capability information of the mobile device and a corresponding network capability information for the geographic location. The device capability information includes a non-standalone (NSA) dual-connectivity (DC) capability, a standalone (SA) NR band support capability, a carrier aggregation (CA) band combination capability, a DC band combination capability, etc.

In other implementations, the highest priority RAT is based on a highest quality of service available to the RAT at the geographic location or the best user quality of experience. For example, the highest priority RAT can be based on the network latency (e.g., round-trip time) where the RAT offering the lowest latency is prioritized higher than RATs providing higher network latencies. The highest priority RAT can also be based on the speed or throughput, packet error rate, or other performance metrics.

In some implementations, the RAT priority order and the highest priority RAT is pre-configured on the mobile device (e.g., on the subscriber identity module (SIM)) based on the geographic location or the public land mobile network (PLMN) that the mobile device is connected to. The mobile device can include a database with geolocation, PLMN, band, and corresponding highest priority RATs.

In some implementations, the mobile device maintains the last geographic location's RAT and bands (RAT priority order) in its acquisition database to allow the mobile device to quickly reconnect to previous highest priority RATs if it goes to idle mode or if it is powered off. The acquisition database can include several entries per geographic location (e.g., the highest RATs determined for different geographic locations) to provide the mobile device with different best options to access in different geographic locations.

If, at 320, the mobile device determines that it is not connected to the cellular network using the highest priority RAT or band, the mobile device, at 325, connects to the cellular network using the highest priority compatible RAT/band for the geographic location. In some implementations, the network provides via, e.g., RRC, OMA-DM config, or TCP, the RAT to use (or RAT to switch to) in a given geographic location (i.e., the RAT compatible with the mobile device that has the highest priority for the given geographic location).

At 330, the mobile device communicates with the cellular network (e.g., transmits and receive communication signals) using the highest priority RAT selected at 325 or continues communicate with the cellular network with the same RAT if the mobile device determines at 320 that it is already using the highest priority compatible RAT to communicate with the cellular network.

The mobile device continues to operate using the RAT/band determined at 320 (e.g., the highest priority RAT/band of the RAT priority order determined at 310 and stored in the acquisition database) until the mobile device's geographic location changes (or the network configuration at the geographic location changes, e.g., different bands/bandwidth allocation for particular RATs in the geographic location). At

340, if the mobile device determines that its geographic location has changed (or the network configuration at the geographic location has changed), the mobile device determines the RAT priority order at the new geographic location (310) or with the new network configuration and determines if it is still using the highest priority compatible RAT for the new geographic location (320) (e.g., if is using the highest priority RAT in the new RAT priority order for the geographic location). If the highest priority RAT in the geographic location (e.g., new geographic location) is the same as the highest priority RAT in the previous geographic location or with previous network configuration in the previous geographic location, the mobile device continues to communicate with the network using the same RAT (330). However, if the highest priority RAT in the geographic location is different from the RAT currently in use, the mobile device connects to and communicate with the cellular network using the new highest priority compatible RAT (325, 330).

In some implementations, the operation of the mobile device based on flowchart 300 can apply to mobile devices roaming nationally or internationally. In other implementations, a geofencing policy can be applied where the operation of the mobile device based on flowchart 300 (i.e., selection of RAT based on RAT priority) is only applied within certain geographic boundaries and the OEM default RAT is used when outside those geographic boundaries. That is, the geofence defines a virtual perimeter or geographic boundary for a real-world geographic area (e.g., defined by GPS/GNSS coordinates), that enables software in the mobile device to trigger a response (e.g., override the default RAT priority configuration and use the network provided or mobile device computed RAT priority configuration) when the mobile device enters or leaves the particular area defined by the geofence. The geofence can be communicated to the mobile device using, for example, OMA-DM device configuration SMS messages.

Figure 4:
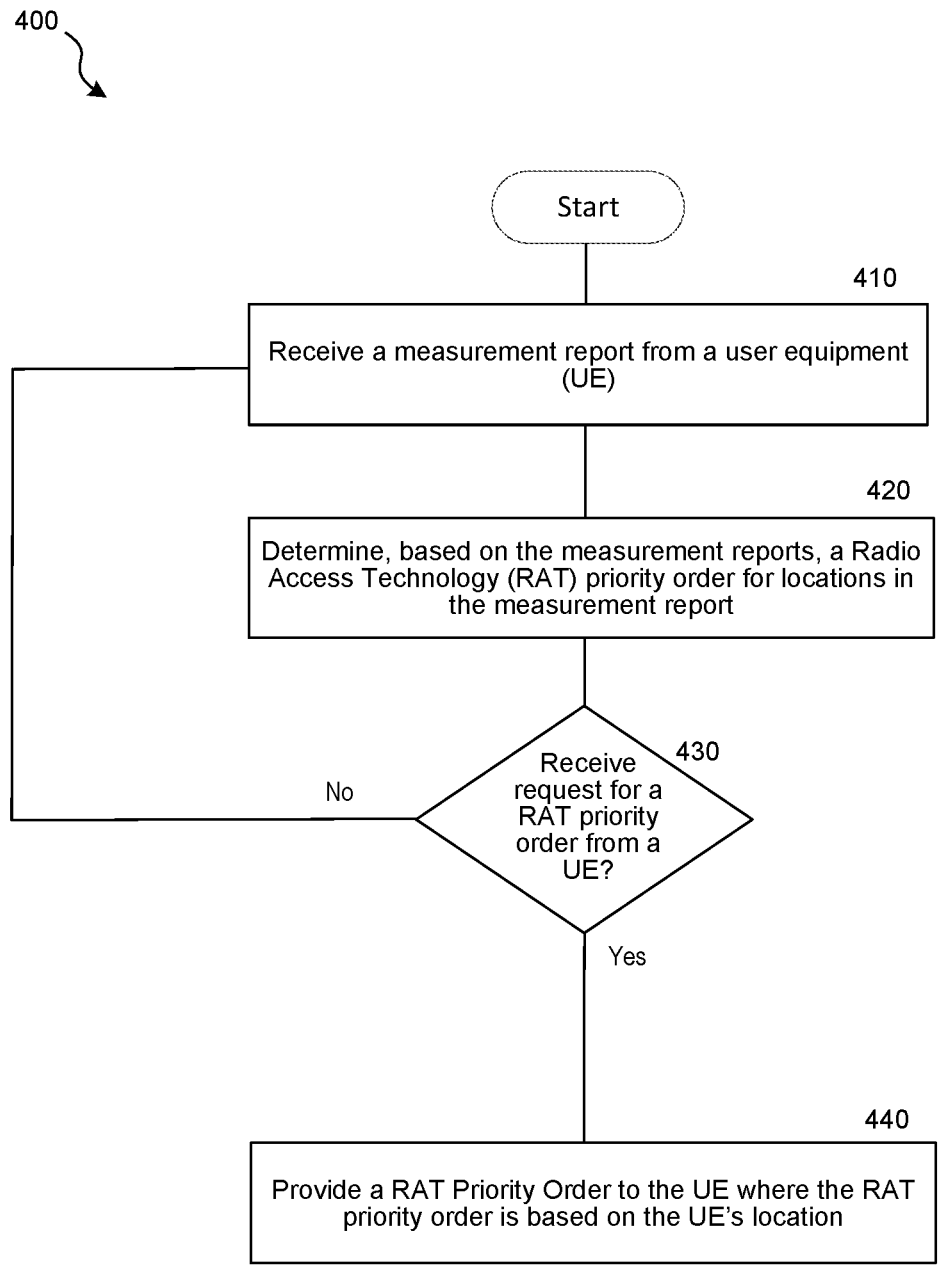
FIG. 4 is a flowchart that illustrates a network determination of a RAT priority.

FIG. 4 is a flowchart 400 that illustrates network determination of a RAT priority. At 410 the network receives measurement reports from UEs. The measurement reports include measurements from different UEs operating in different RATs and different geographic locations. The network can request the UE to provide, for example, intra-frequency measurements, inter-frequency measurements, and inter-RAT measurements.

At 420, the network can use the measurement reports to determine RAT priority orders for different geographic locations. The network can determine based on the measurement reports that a particular RAT is a given geographic location can provide a better quality of experience to a user than another RAT in the same geographic location (i.e., the network can dynamically adjust RAT priorities based on UE measurement reports). For example, if the measurement report includes measurements on one or more RATs and location information corresponding to the measurements, the network can determine based on the measurement report, a RAT priority order corresponding to a location included in the measurement report's location information.

In some implementations, the network determines RAT priority orders for different geographic locations without using UE measurement reports. Instead, the network (or the UE) can determine RAT priority orders based on information on the band and bandwidth configurations for the geographic locations (e.g., the frequency bands and/or frequency bandwidth allocated for use by UEs in the geographic location). The network allocates the frequency bands and/or bandwidths to be used by different RATs in the RAT priority order either statically or dynamically (e.g., in real-time via dynamic spectrum sharing (DSS)).

At 430, the network can receive a request from a UE for a RAT priority order for the UE's current geographic location. In response to this request, the network at 440 can provide the RAT priority order to the UE corresponding to the UE's current location. In some implementations, the network can transmit the RAT priority order to UEs without the UEs having to request it from the network. For example, the network can provide the RAT priority order to the UEs on initial acquisition or any time that the RAT priority order changes in a geographic location (e.g., RAT priority changes can be triggered by new or additional measurement reports from UEs in the geographic location).

The network can transmit the RAT priority order to the UE (or the RAT that the UE needs to switch to) through a radio resource control (RRC) configuration message, through OMA-DM SMS configuration message, or though TCP messages. The RAT priority order sent to the UE is selected from one or more RAT priority orders corresponding to one or more geographic locations, the selection being based on UEs current location (e.g., based on the UE's GPS/GNSS coordinates or based on the PLMN that the UE is connected to).

In some implementations, the network can also transmit a geofencing information to the UEs where the geofencing information defines a geofence where the UE overrides the default OEM-configured RAT and uses the network-provided (or UE computed) RAT. That is, the geofencing information defines a first geographic location where the UE selects the RAT to use based on the RAT priority order determined at 420 in FIG. 4 (or 310 in FIG. 3) and a second geographic location where the UE selects the RAT to use based on the default RAT preconfigured in the UE (e.g., the OEM factory-default or operator-default RAT priority). The geofencing information can be transmitted to the UE via OMA-DM SMS messages.

Some portions of the disclosure can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems can be used with programs in accordance with the described teachings, or it can prove convenient to construct more specialized apparatus to perform the methods of some implementations. The required structure for a variety of these systems will appear from the description. In addition, the techniques are not described with reference to any particular programming language, and various implementations can thus be implemented using a variety of programming languages.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation.

The applicant reserves the right to pursue such additional claim forms in either this application or in a continuing application.

We claim:

1. A system comprising:
   at least one hardware processor; and
   at least one non-transitory memory, coupled to the at least one hardware processor and storing instructions, which, when executed by the at least one hardware processor, cause the system to:
   determine a first radio access technology (RAT) at a first geographic location of a wireless network, wherein the first RAT is a highest priority RAT in the first geographic location;
   connect to the wireless network using the first RAT,
      wherein the system is compatible with the first RAT, and
      wherein the first RAT comprises a RAT in the first geographic location with a largest aggregate bandwidth based at least on a total bandwidth of all frequency bands allocated to the first RAT at the first geographic location; and
   connect to the wireless network using a second RAT in response to the system changing locations to a second geographic location different from the first geographic location,
      wherein the second RAT at the second geographic location comprises a larger aggregate bandwidth than the first RAT in the first geographic location, and
      wherein the larger aggregate bandwidth is based at least on a total bandwidth of all frequency bands allocated to the second RAT at the second geographic location.

2. The system of claim 1, wherein the largest aggregate bandwidth is based on a capability information of the system and a corresponding network capability information for the first geographic location, wherein the capability information for the system comprises at least one of a non-standalone (NSA) dual-connectivity (DC) capability, a standalone (SA) band support capability, a carrier aggregation (CA) band combination capability, or a DC band combination capability.

3. The system of claim 1, wherein the first RAT and the second RAT comprises at least one of LTE, non-standalone (NSA) NR, or standalone (SA) NR.

4. The system of claim 1 further caused to:
   receive geofencing information, wherein the geofencing information defines a geofence wherein the system overrides a default RAT priority configuration and determines the first RAT and the second RAT based on at least one of a wireless network provided RAT priority configuration or a system computed RAT priority configuration.

5. The system of claim 1 further caused to:
   receive the highest priority RAT in the first geographic location through a radio resource control (RRC) configuration message; and
   store the highest priority RAT in a memory of the system, wherein determining the first RAT at the first geographic location comprises querying the memory for the highest priority RAT.

6. A non-transitory computer-readable storage medium storing instructions, which, when executed by one or more data processors of a system, cause the system to:
   determine a first radio access technology (RAT) at a first geographic location of a wireless network, wherein the first RAT is a highest priority RAT in the first geographic location;
   connect to the wireless network using the first RAT,
      wherein the system is compatible with the first RAT, and
      wherein the first RAT comprises a RAT in the first geographic location with a largest aggregate bandwidth based at least on a total bandwidth of all frequency bands allocated to the first RAT at the first geographic location; and
   connect to the wireless network using a second RAT in response to the system changing locations to a second geographic location different from the first geographic location,
      wherein the second RAT at the second geographic location comprises a larger aggregate bandwidth than the first RAT in the first geographic location, and
      wherein the larger aggregate bandwidth is based at least on a total bandwidth of all frequency bands allocated to the second RAT at the second geographic location.

7. The non-transitory computer-readable storage medium of claim 6, wherein the largest aggregate bandwidth is based on a capability information of the system and a corresponding network capability information for the first geographic location.

8. The non-transitory computer-readable storage medium of claim 7, wherein the capability information for the system comprises at least one of a non-standalone (NSA) dual-connectivity (DC) capability, a standalone (SA) band support capability, a carrier aggregation (CA) band combination capability, or a DC band combination capability.

9. The non-transitory computer-readable storage medium of claim 6, wherein the first RAT and the second RAT comprises at least one of LTE, non-standalone (NSA) NR, or standalone (SA) NR.

10. The non-transitory computer-readable storage medium of claim 6 further caused to: receive geofencing information, wherein the geofencing information defines a geofence wherein the system overrides a default RAT priority configuration and determines the first RAT and the second RAT based on at least one of a wireless network provided RAT priority configuration or a system computed RAT priority configuration.

11. The non-transitory computer-readable storage medium of claim 6 further caused to:
    receive the highest priority RAT in the first geographic location through a radio resource control (RRC) configuration message.

12. The non-transitory computer-readable storage medium of claim 6 further caused to:
    store the highest priority RAT in a memory of the system, wherein determining the first RAT at the first geographic location comprises querying the memory for the highest priority RAT.

13. A system comprising:
    at least one hardware processor; and
    at least one non-transitory memory, coupled to the at least one hardware processor and storing instructions, which, when executed by the at least one hardware processor, cause the system to:
    determine a first radio access technology (RAT) at a first geographic location of a wireless network, wherein the first RAT is a highest priority RAT in the first geographic location;

connect to the wireless network using the first RAT; and
connect to the wireless network using a second RAT in response to the system changing locations to a second geographic location different from the first geographic location,
  wherein the second RAT at the second geographic location comprises a larger aggregate bandwidth than the first RAT in the first geographic location, and
  wherein the larger aggregate bandwidth is based at least on a total bandwidth of all frequency bands allocated to the second RAT at the second geographic location.

14. The system of claim 13, wherein the first RAT comprises a RAT in the first geographic location with a largest aggregate bandwidth.

15. The system of claim 14, wherein the largest aggregate bandwidth is based on a capability information of the system and a corresponding network capability information for the first geographic location, wherein the capability information for the system comprises at least one of a non-standalone (NSA) dual-connectivity (DC) capability, a standalone (SA) band support capability, a carrier aggregation (CA) band combination capability, or a DC band combination capability.

16. The system of claim 13, wherein the first RAT and the second RAT comprises at least one of LTE, non-standalone (NSA) NR, or standalone (SA) NR.

17. The system of claim 13 further caused to:
receive geofencing information, wherein the geofencing information defines a geofence wherein the system overrides a default RAT priority configuration.

18. The system of claim 13, wherein the first RAT and the second RAT is determined based on at least one of a wireless network provided RAT priority configuration or a system computed RAT priority configuration.

19. The system of claim 13 further caused to:
receive the highest priority RAT in the first geographic location through a radio resource control (RRC) configuration message; and
store the highest priority RAT in a memory of the system, wherein determining the first RAT at the first geographic location comprises querying the memory for the highest priority RAT.

* * * * *